United States Patent
Wu

(10) Patent No.: US 7,894,220 B2
(45) Date of Patent: Feb. 22, 2011

(54) VOLTAGE GENERATING CIRCUIT

(75) Inventor: Fu-An Wu, Hsinchu (TW)

(73) Assignee: Elite Semiconductor Memory Technology Inc., Hsinchu (TW)

( * ) Notice: Subject to any disclaimer, the term of this patent is extended or adjusted under 35 U.S.C. 154(b) by 238 days.

(21) Appl. No.: 12/057,341

(22) Filed: Mar. 27, 2008

(65) Prior Publication Data

US 2009/0244940 A1   Oct. 1, 2009

(51) Int. Cl.
*H02M 3/18* (2006.01)

(52) U.S. Cl. ......................................................... 363/60

(58) Field of Classification Search ................... 363/59, 363/60, 61; 323/313
See application file for complete search history.

(56) References Cited

U.S. PATENT DOCUMENTS

| | | | | |
|---|---|---|---|---|
| 4,061,929 A * | 12/1977 | Asano | ........................ | 327/589 |
| 5,043,858 A * | 8/1991 | Watanabe | ..................... | 363/61 |
| 5,748,032 A * | 5/1998 | Baek | ........................ | 327/536 |
| 5,856,918 A * | 1/1999 | Soneda et al. | .................. | 363/60 |
| 6,141,229 A * | 10/2000 | Mok | ........................... | 363/60 |
| 6,466,079 B1 * | 10/2002 | Kushnarenko | .............. | 327/536 |
| 6,480,057 B2 * | 11/2002 | Ogura | ........................ | 327/536 |
| 6,512,413 B2 * | 1/2003 | Okutsu et al. | ............... | 327/543 |
| 6,661,682 B2 * | 12/2003 | Kim et al. | ..................... | 363/59 |
| 2006/0244517 A1 * | 11/2006 | Lee et al. | .................... | 327/536 |

OTHER PUBLICATIONS

Yalcin Bulut, "Low-threshold MOSFETs can alleviate power-hungry portable devices", Apr. 5, 2006, EE Times India.*

* cited by examiner

*Primary Examiner*—Adolf Berhane
*Assistant Examiner*—Jeffrey Gblende
(74) *Attorney, Agent, or Firm*—Jianq Chyun IP Office

(57) ABSTRACT

A voltage generating circuit is provided, including a voltage output terminal, a ground terminal, a capacitor, a selector, a first switch, and a second switch. The capacitor is connected between a pump signal and the output of the selector. The selector is controlled by a first control signal and used to select the voltage source or the voltage output terminal to connect the capacitor. The first switch is controlled by a second control signal, and the second switch is controlled by a third control signal. When the first switch is turn-on, the voltage output terminal is connected to the ground terminal. When the second switch is turn-on, the voltage output terminal is connected to the voltage source.

17 Claims, 8 Drawing Sheets

VOLTAGE GENERATING CIRCUIT

BACKGROUND OF THE INVENTION

1. Field of Invention

The present invention generally relates to voltage generating circuit, and more particularly to a voltage generating circuit with improved boosting efficiency.

2. Description of Prior Art

A voltage generating circuit which generates a higher voltage than the supplied power voltage source is widely used in memory devices, such as flash memory, for programming the memory content. Providing a power voltage source with a constant high voltage level is one of the solutions for writing memory devices, but this solution has poor power efficiency since only the writing procedure requires the high voltage level. Thus, providing a voltage generating circuit in the memory device is an appropriate solution.

The U.S. Pat. No. 5,043,858 provides a high-voltage generating circuit for generating a high voltage from a power voltage source. Referring to FIGS. 1 and 2, FIG. 1 is a circuit diagram of the high-voltage generating circuit 10, and FIG. 2 is a waveform diagram of the high-voltage generating circuit 10. The high-voltage generating circuit comprises a series circuit 1 composed of a plurality of field effect transistors $M_0 \sim M_n$ connected in series between a power voltage terminal $V_{CC}$ and a high-voltage output terminal $V_{OUT}$, a plurality of capacitors $C_1 \sim C_n$ with one end connected to intermediate nodes of the field effect transistors $M_0 \sim Mn$, and first and second clock signal generators 2, 2' for generating first and second clock signals $C_L1$, $C_L2$ with higher level than the power voltage and different phases. The first and second clock signals $C_L1$, $C_L2$ having different phases are applied alternatively to the other ends of these adjacent capacitors $C_1 \sim C_n$ respectively.

The high-voltage generating circuit 10 needs a clock signal $\phi$ to generate four control signals $\phi_1 \sim \phi_4$ with different, non-overlapping phases. See FIG. 2, the four control signals $\phi_1 \sim \phi_4$ should be generated precisely to be non-overlap at the high voltage level, and thus it increases the complexity of generating the four control signals $\phi_1 \sim \phi_4$. Additionally, in FIG. 2, the duty cycle of first and second clock signals $C_L1$, $C_L2$ at high level voltage, 3V, is 25%. In some applications, the requirement of duty cycle may be larger than 0.25, thus it may not be adapted in some applications.

The U.S. Pat. No. 6,480,057 provides a voltage doubling circuit which can generate a high-level voltage from the power voltage source. Referring to FIGS. 3 and 4, FIG. 3 is a circuit diagram of a voltage doubling circuit 30, and FIG. 4 is a waveform diagram of the voltage doubling circuit 30. The voltage doubling circuit 30 is composed of two inverters 41, 42, a capacitor 43, three p-type metal-oxide-semiconductor (PMOS) transistors 44, 45, 46, and two n-type metal-oxide-semiconductor (NMOS) transistors 47, 48. The voltage doubling circuit 30 generates a clock signal CLK2' having amplitude doubled to power supply voltage CLK2's (as shown in FIG. 4). The clock signal CLK2' is applied to the gate of the NMOS transistor connected to the external capacitor. Thus, by increasing the gate voltage of the NMOS transistor, the resistance of the NMOS transistor connected to the external capacitor is sufficiently reduced and transfer efficiency of positive charge is enhanced.

Since the feedback paths exist in the transistors 45, 44, and 47, and the leak current also incurs in the voltage doubling circuit 30, thus the time of charging the capacitor of the voltage doubling circuit 30 to the predetermined level increases. Therefore, the transient time of the voltage doubling circuit 30 may increase. In the high speed circuit application, the voltage doubling circuit 30 may not be an appropriate choice.

In order to reduce the complexity and delay time of the voltage generating circuit, the embodiment of the invention provides a voltage generating circuit with less circuit complexity to generate an output clock signal.

SUMMARY OF THE INVENTION

Accordingly, the present invention is related to a voltage generating circuit with less circuit complexity, which generates an output clock signal having amplitude larger than the power supply voltage.

The present invention provides a voltage generating circuit. The voltage generating circuit comprises a voltage output terminal, a ground terminal, a diode, a capacitor, a selector, a first switch, and a second switch. The diode has a first node connected to a voltage source and a second node. The capacitor is connected between a pump signal and the second node. The selector is controlled by a first control signal and used to select the voltage source or the voltage output terminal to connect the second node. The first switch is controlled by a second control signal, and the second switch is controlled by a third control signal. When the first switch is turn-on, the voltage output terminal is connected to the ground terminal. When the second switch is turn-on, the voltage output terminal is connected to the voltage source.

The present invention provides a voltage generating circuit. The voltage generating circuit comprises a voltage output terminal, a ground terminal, a diode, a first transistor, a second transistor, a capacitor, a third transistor and a fourth transistor. Wherein, the diode has a first node connected to a voltage source and a second node. The first transistor is controlled by a first control signal. The second transistor is connected to the first transistor and controlled by the first control signal. When the first transistor is turned-on, the second transistor is turned-off, and when the first transistor is turned-off, the second transistor is turned-on. The capacitor has a first terminal and a second terminal. The first terminal is used to receive a pump signal, and the second terminal is connected to the second node. The third transistor is controlled by a second control signal. When the third transistor is turned-on, the voltage output terminal is connected to the ground terminal. The fourth transistor is controlled by a third control signal. When the third transistor is turned-on, the voltage output terminal is connected to the voltage source. When the first transistor is turned-on, the second node is connected to the voltage source; and when the second transistor is turned-on, the second node is connected to the voltage output terminal.

The voltage generating circuit provided by the embodiment of the present invention has less circuit complexity and higher operation frequency than the conventional voltage generating circuit. Thus the voltage generating circuit provided by the embodiment of the present invention is a low cost device and suitable for high speed circuit application.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
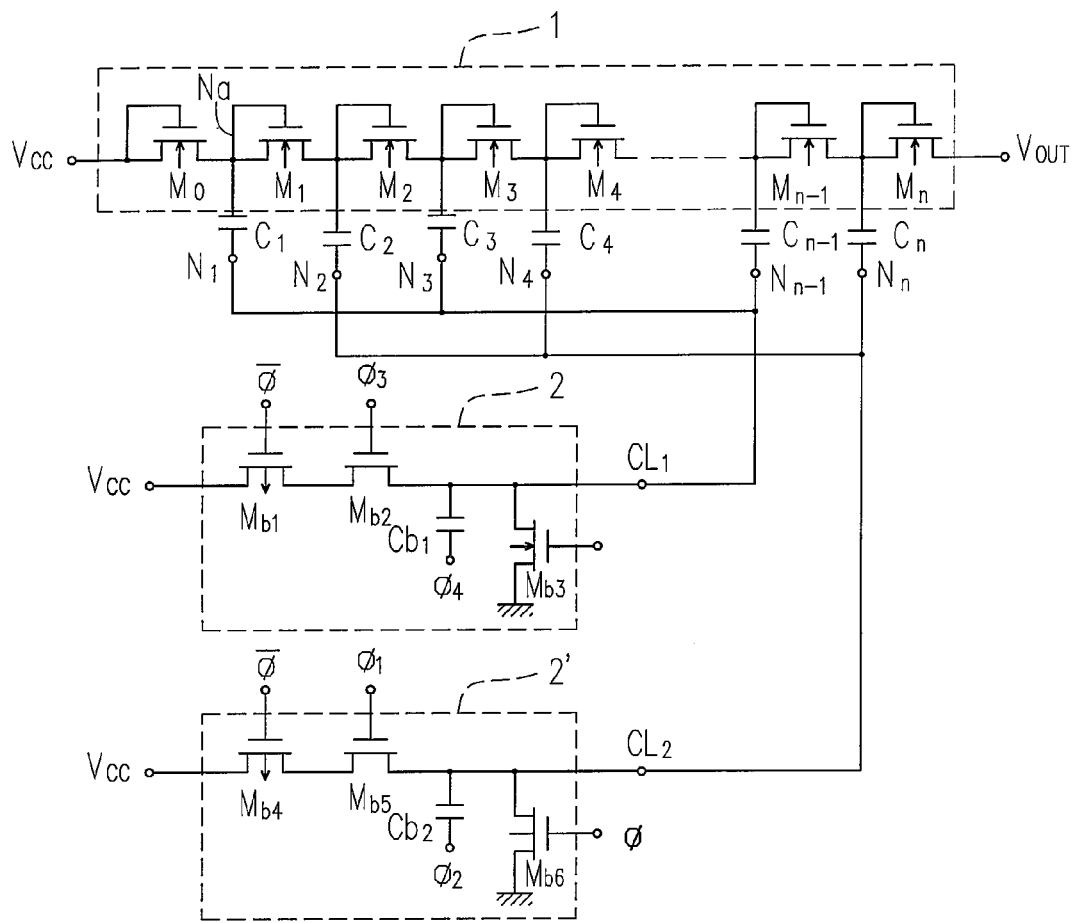
FIG. 1 is a circuit diagram of the high-voltage generating circuit 10.
Figure 2:
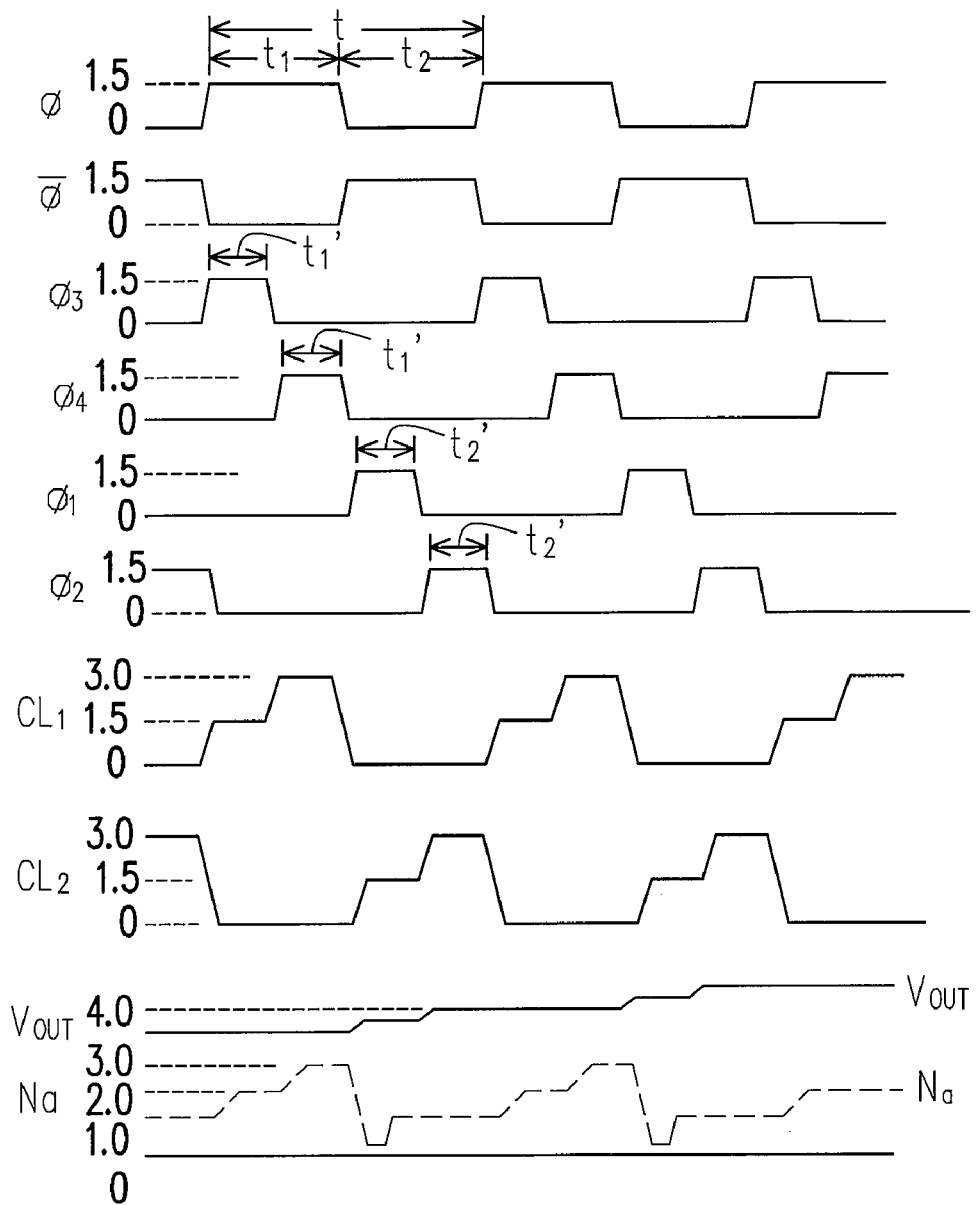
FIG. 2 is a waveform diagram of the high-voltage generating circuit 10.
Figure 3:
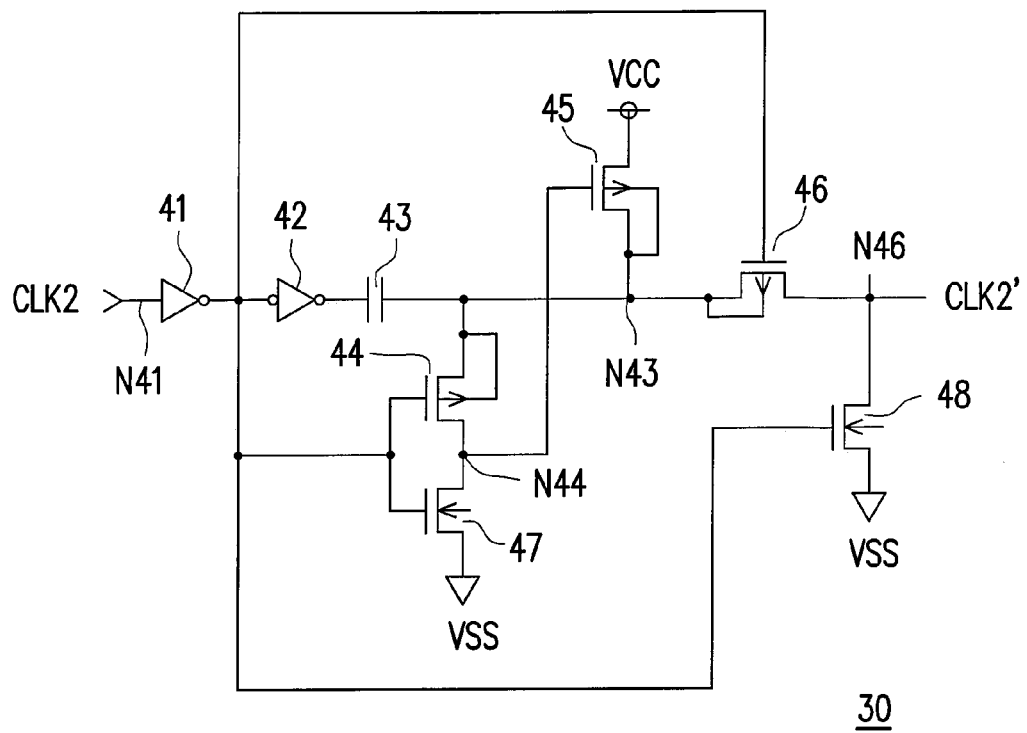
FIG. 3 is a circuit diagram of a voltage doubling circuit 30.
Figure 4:
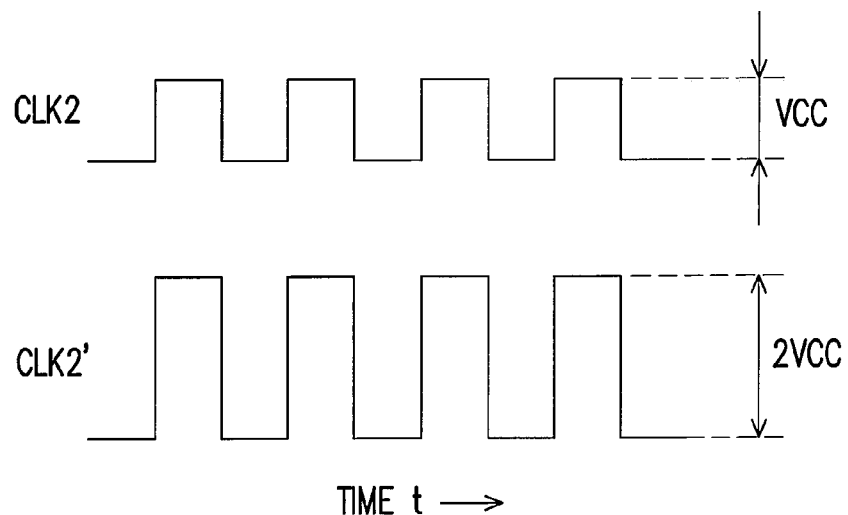
FIG. 4 is a waveform diagram of the voltage doubling circuit 30.

Reference will now be made in detail to the present preferred embodiment of the invention, examples of which are illustrated in the accompanying drawings. Wherever possible, the same reference numbers are used in the drawings and the description to refer to the same or like parts.

Figure 5:
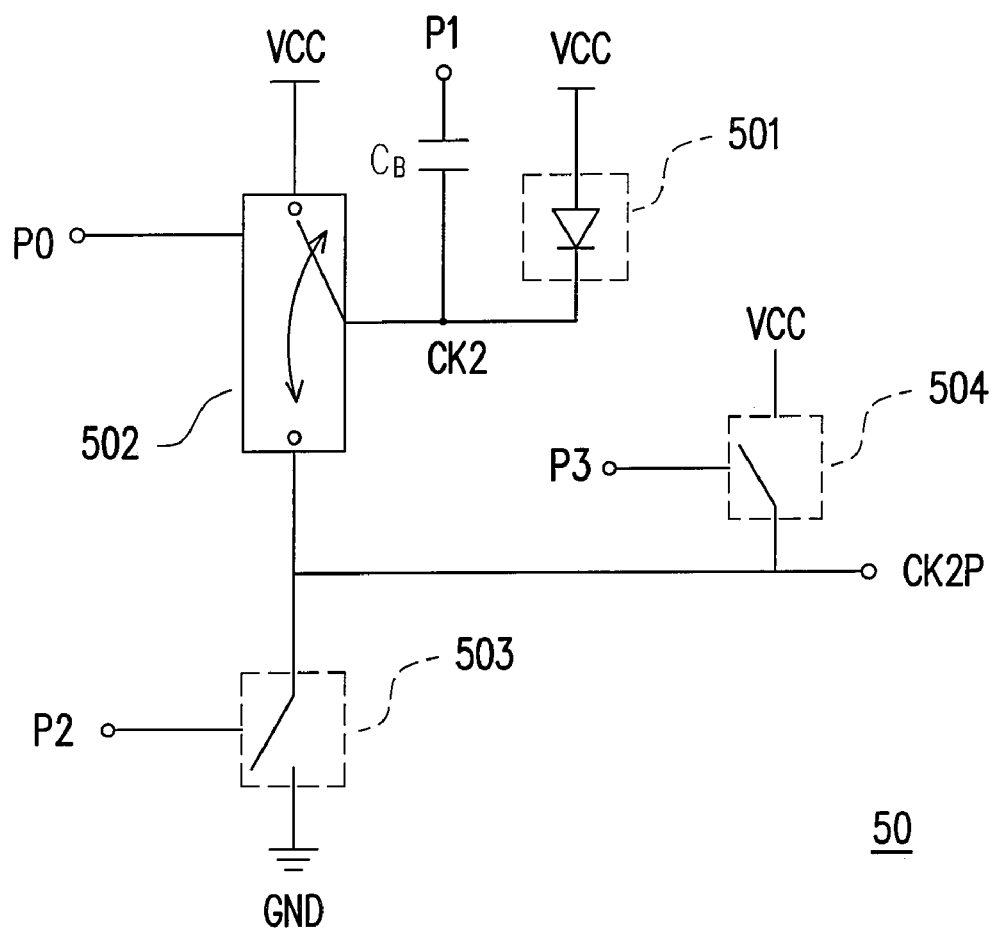
FIG. 5 is a circuit diagram of a voltage generating circuit 50 provided by an embodiment.

The voltage generating circuit provided by the embodiment of the present invention has less circuit complexity and higher operation frequency than the conventional voltage generating circuit. Referring to FIG. 5, FIG. 5 is a circuit diagram of a voltage generating circuit 50 provided by an embodiment. The voltage generating circuit 50 comprises a voltage output terminal CK2P, a ground terminal GND, a diode 501, a capacitor $C_B$, a selector 502, a first switch 503, and a second switch 504. The diode 501 has a first node connected to a voltage source VCC and a second node CK2. The capacitor $C_B$ is connected between a pump signal P1 and the second node CK2. The selector 502 is controlled by a first control signal P0 and used to select the voltage source VCC or the voltage output terminal CK2P to connect the second node CK2. The first switch 503 is controlled by a second control signal P2, and the second switch 504 is controlled by a third control signal P3. When the first switch 503 is turn-on, the voltage output terminal CK2P is connected to the ground terminal GND. When the second switch 504 is turn-on, the voltage output terminal CK2P is connected to the voltage source VCC.

In fact, in some application the diode 501 and the voltage source connected to the first node of the diode 501 in FIG. 5 may be removed. However, the diode 501 helps to pre-charge the capacitor $C_B$, and thus the transient time of the voltage generating circuit 50 may increase.

Figure 6:
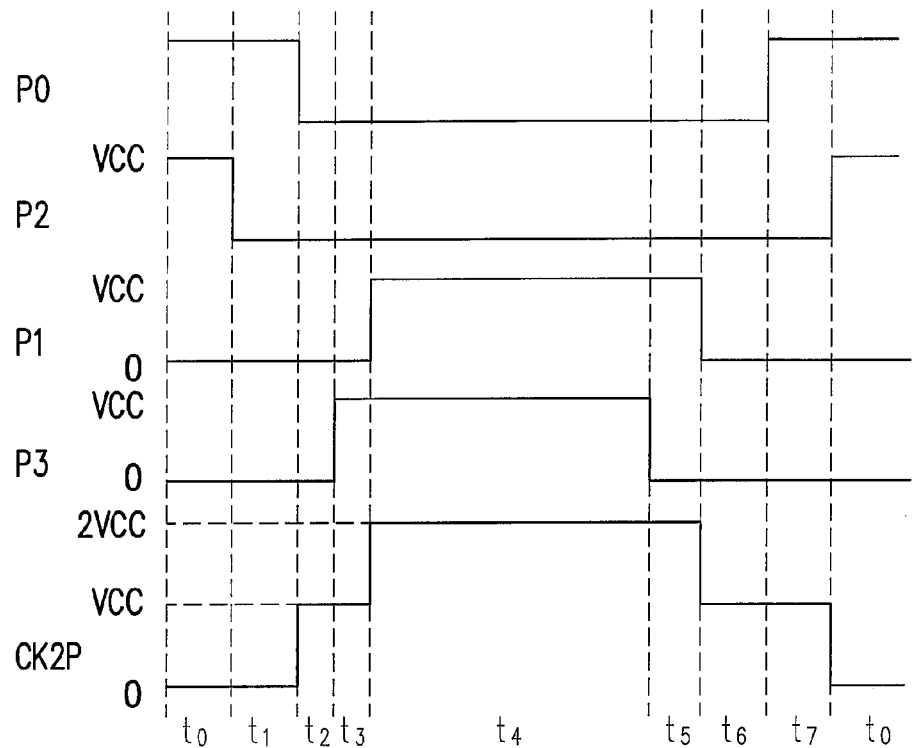
FIG. 6 is a waveform diagram of the voltage generating circuit 50.

FIG. 6 is a waveform diagram of the voltage generating circuit 50. Assuming the threshold voltages of transistors in the voltage generating circuit 50 are neglected, the waveforms of the voltage generating circuit 50 are shown in the FIG. 6. The voltage generating circuit 50 can generate a higher voltage at the voltage output terminal CK2P than the voltage source VCC. In the embodiment the voltage level of the voltage output terminal CK2P is doubled to the voltage source VCC's, but it does not intend to limit the scope of the invention.

At time $t_0$, the first control signal P0 is high, and thus the selector 502 selects the voltage source VCC to connect to the second node CK2. The second control signal P2 makes the first switch 503 is turned-on. So the second node CK2 is charged to be approximated to the voltage level of the voltage source VCC, and the output terminal CK2P is pulled down to ground. At time $t_1$, the first switch 502 is turned-off, since the second control signal P2 has turned from high to low. At time $t_2$, the first control signal P0 is low, and thus the selector 502 selects the voltage source VCC to connect to the voltage output terminal CK2P. The voltage output terminal CK2P is charged to be approximated to the voltage level of the voltage source VCC via the diode 501.

At time $t_3$, the third control signal P3 turns on the third switch 504, and thus the voltage output terminal CK2P is charged to be more approximated to the voltage level of the voltage source VCC than that at time $t_2$. At time $t_4$, the pump signal P1 is pulled up to the voltage level of the voltage VCC from ground. At the same time the second node CK2 is charged to be approximated to twice of the voltage level of the voltage source VCC, and then the charges of the second node CK2 transfer to the voltage output terminal CK2P via the selector 502. Thus the voltage level of the voltage output terminal CK2P is about to twice the voltage level of the voltage source VCC.

At time $t_5$, the third signal P3 changes to low, and the third switch 504 is turn-off. At time $t_6$, the pump signal P1 is pulled down to ground. At the same time, the second node CK2 is discharged to be approximated to the voltage level of the voltage source VCC, and the charges of the voltage output terminal CK2P transfer to the second node CK2. Thus the voltage level of the voltage output terminal CK2P is approximately to the voltage level of the voltage source VCC. At time $t_7$, the first control signal P0 is high, and thus the selector 502 selects the voltage source VCC to connect to the second node CK2. After that, the operation of the voltage generating circuit 50 can be restarted from time $t_0$.

The third control signal P3 is used for charging the voltage output terminal CK2P to be about the voltage level of the voltage source VCC. Herein, some points should be noted as follows. The first switch 503 is turned-on after the second node CK2 is connected to the voltage source VCC, and then the first switch 503 is turned-off before the second node CK2 is connected to the voltage output terminal CK2P (see times $t_7$, $t_0$, $t_1$). In other word, the second control signal P2 must be covered by the first control signal P0 to prevent boosted voltage discharge. Furthermore, the pump signal P1 is pulled down before the second node CK2 is connected to the voltage source VCC, and thus the charges of the voltage output terminal CK2P can transfer to the second node CK2 (see time $t_6$). In addition, the second node CK2 is connected to the output terminal CK2P before the pump signal P1 is pulled up.

Figure 7:
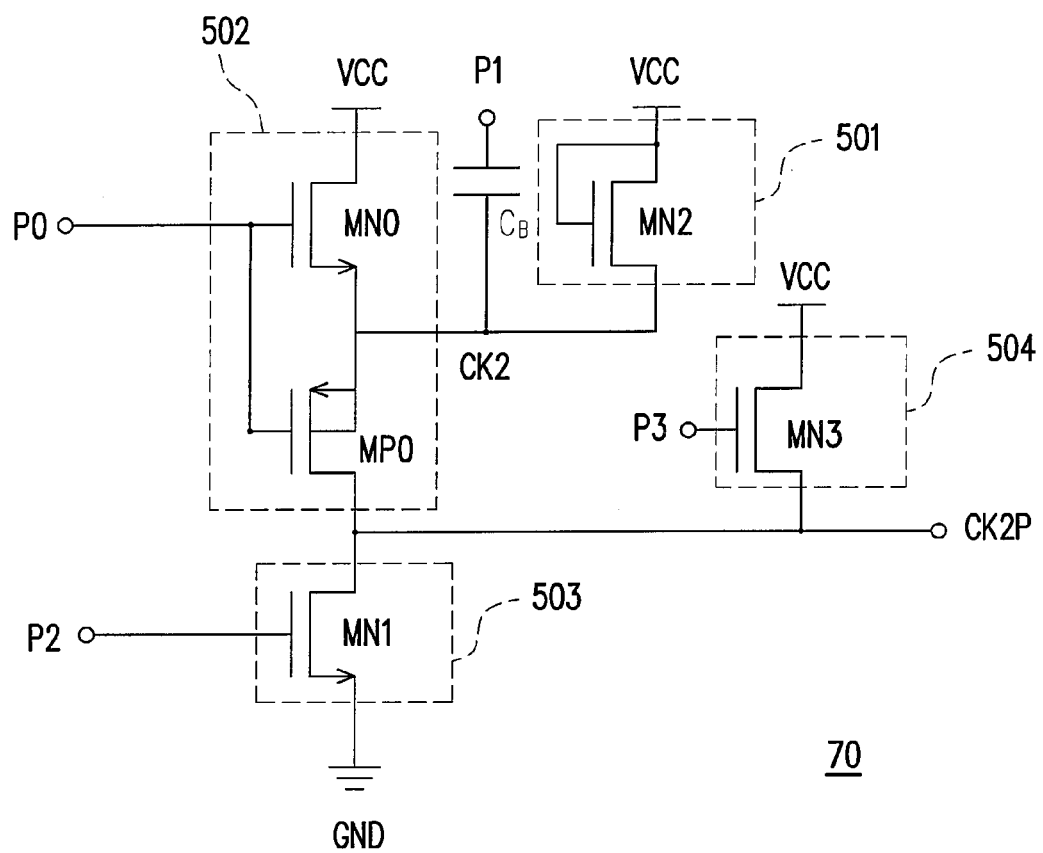
FIG. 7 is a circuit diagram of the voltage generating circuit 70 provided by an embodiment of the present invention.

Referring to FIG. 7, FIG. 7 is a circuit diagram of the voltage generating circuit 70 provided by an embodiment of the present invention. The diode 501 is a first NMOS transistor MN2. Wherein, a gate and a drain of the first NMOS transistor MN2 are connected to the voltage source. A source of the first NMOS transistor MN2 is connected to the second node CK2. The first switch 503 is a third NMOS transistor MN1, and the second switch 504 is a fourth NMOS transistor MN3. Wherein, a gate of the third NMOS transistor MN1 is connected to the second control signal P2, a drain of the third NMOS transistor MN1 is connected to the voltage output terminal CK2P, and a source of the third NMOS MN1 transistor is connected to the ground terminal GND. A gate of the fourth NMOS transistor MN3 is connected to the third control signal P3, a source of the fourth NMOS transistor MN3 is connected to the voltage output terminal CK2P, and a drain of the fourth NMOS transistor MN3 is connected to the voltage source VCC.

The selector 502 comprises a second NMOS transistor MN0 and a first PMOS transistor MP0. A gate of the second NMOS transistor MN0 is connected to the first control signal P0, a drain of the second NMOS transistor MN0 is connected to the voltage source VCC, and a source of the second NMOS MN0 transistor is connected to the second node CK2. A gate of the first PMOS transistor MP0 is connected to the first control signal P0, and a drain of the first PMOS transistor MP0 is connected to the voltage output terminal CK2P. A source of the first PMOS transistor MP0 is connected to the second node CK2, and a body of the first PMOS transistor MP0 is connected to the second node CK2. The first, second and fourth NMOS transistors MN2, MN0, MN3 are low threshold NMOS transistors with the threshold levels $V_{th}$.

Figure 8:
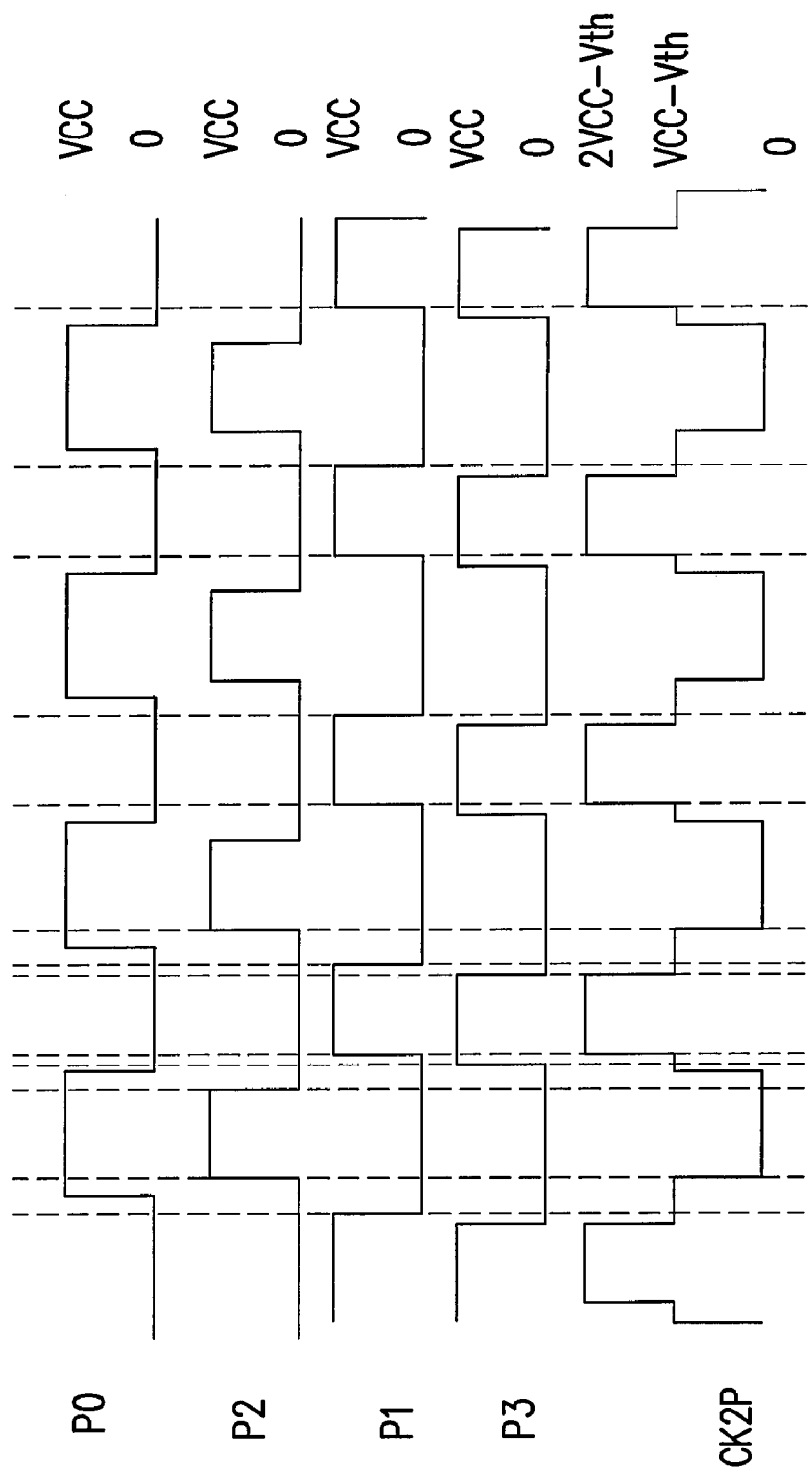
FIG. 8 is a waveform diagram of the voltage generating circuit 70.

Referring to FIG. 8, FIG. 8 is a waveform diagram of the voltage generating circuit 70. When the pump signal P1 has the voltage level same as that of the voltage source VCC, and the third control signal P3 is high, the voltage output terminal CK2P has the voltage level $2VCC-V_{th}$.

The voltage generating circuit 70 may further comprise a control unit used to generate the pump signal, the first, second and third control signals P0~P3. The third control signal P3 is used to help to charge the voltage output terminal CK2P to be the voltage level $VCC-V_{th}$. The second control signal P2 is pulled up after the first control signal P0 is pulled up, and then the second control signal P2 is pulled down before the first control signal P0 is pulled down. The pump signal P1 is pulled down before the first PMOS transistor MP0 is turn-off so as to protect the PN junction of the first PMOS transistor MP0. The first PMOS transistor MP0 is turn-on before the pump signal P1 is pulled up so as to protect the first PMOS transistor MP0.

Figure 9:
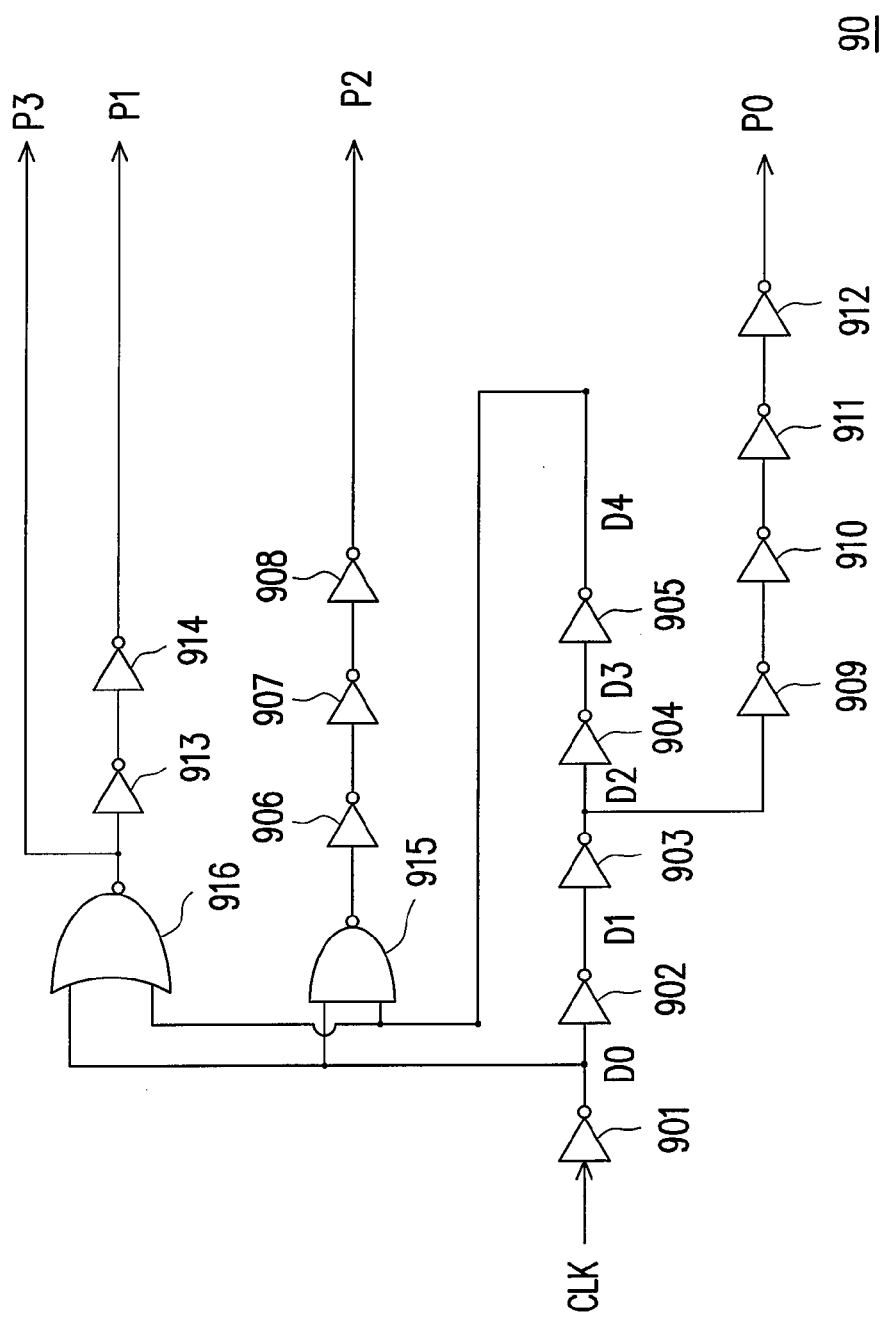
FIG. 9 is a circuit diagram of the control unit 90.

Referring to FIG. 9, which is a circuit diagram of the control unit 90 used to generate the pump signal, the first, second and third control signals P0~P3 as stated above. The control unit 90 comprise a plurality of inverters 901~914, a NOR gate 916, and a NAND gate 915. The inverter 901 is used to receive a clock signal CLK. The inverter 902 is used to receive an output of the inverter 901. The inverter 903 is used to receive an output of the inverter 902. The inverter 904 is used to receive an output of the inverter 904. The inverter 905 is used to receive an output of the inverter 904 and to output the first control signal P0.

The NOR gate 916 receives the outputs of the inverters 905 and 901 and outputs the third control signal P3. The inverter 913 is used to receive an output of the NOR gate 916. The inverter 914 is used to receive an output of the inverter 914 and to output the pump signal P1. The NAND gate 915 is used to do a NAND-operation of the outputs of the inverters 905 and 901. The inverter 906 is used to receive an output of the NAND gate 915 and to output the second control signal P2.

The voltage generating circuit provided by the embodiment of the present invention has less circuit complexity and higher operation frequency than the conventional voltage generating circuit. Thus the voltage generating circuit provided by the embodiment of the present invention is a low cost device and suitable for low voltage and high speed circuit application.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A voltage generating circuit, comprising:
    a voltage output terminal and a ground terminal;
    a diode, having a first node connected to a voltage source and a second node;
    a capacitor, connected between a pump signal and the second node;
    a selector, controlled by a first control signal, used to select the voltage source or the voltage output terminal to connect to the second node, wherein the selector comprises:
        a second n-type metal-oxide-semiconductor (NMOS) transistor, wherein a gate of the second NMOS transistor is connected to the first control signal, a drain of the second NMOS transistor is connected to the voltage source, and a source of the second NMOS transistor is connected to the second node; and
        a first p-type metal-oxide-semiconductor (PMOS) transistor, wherein a gate of the first PMOS transistor is connected to the first control signal, a drain of the first PMOS transistor is connected to the voltage output terminal, and a source of the first PMOS transistor is connected to the second node;
    a first switch, controlled by a second control signal, wherein when the first switch is turned-on, the voltage output terminal is connected to the ground terminal;
    a second switch, controlled by a third control signal, wherein when the second switch is turned on, the voltage output terminal is connected to the voltage source; and
    a control unit used to generate the pump signal, the first, second and third control signals, wherein the first switch is turn-on after the second node is connected to the voltage source, and then the first switch is turn-off before the second node is connected to the voltage output terminal; wherein the pump signal is pulled down before the second node is connected to the voltage source; and wherein the second node is connected to the voltage output terminal before the pump signal is pulled up.

2. The voltage generating circuit as claim 1, wherein the diode is a first NMOS transistor, wherein a gate and a drain of the first NMOS transistor are connected to the first node, and a source of the first NMOS transistor is connected to the second node.

3. The voltage generating circuit as claim 2, wherein the first NMOS transistor is a low threshold NMOS transistor.

4. The voltage generating circuit as claim 1, wherein the second NMOS transistor is a low threshold NMOS transistor.

5. The voltage generating circuit as claim 1, wherein a body of the first PMOS transistor is connected to the second node.

6. The voltage generating circuit as claim 1, wherein the first switch is a third NMOS transistor, and the second switch is a fourth NMOS transistor; wherein a gate of the third NMOS transistor is connected to the second control signal, a drain of the third NMOS transistor is connected to the voltage output terminal, and a source of the third NMOS transistor is connected to the ground terminal; a gate of the fourth NMOS transistor is connected to the third control signal, a source of the fourth NMOS transistor is connected to the voltage output terminal, and a drain of the fourth NMOS transistor is connected to the voltage source.

7. The voltage generating circuit as claim 6, wherein the fourth NMOS transistor is a low threshold NMOS transistor.

8. The voltage generating circuit as claim 1, wherein the control unit comprises:
    a first inverter, used to receive a clock signal;
    a second inverter, used to receive an output of the first inverter;
    a third inverter, used to receive an output of the second inverter;
    a fourth inverter, used to receive an output of the third inverter;
    a fifth inverter, used to receive an output of the fourth inverter;

a NAND gate, used to do a NAND-operation of the outputs of first and fifth inverters;

a sixth inverter, used to receive an output of the NAND gate;

a seventh inverter, used to receive an output of the sixth inverter;

an eighth inverter, used to receive an output of the seventh inverter and to output the second control signal;

a ninth inverter, used to receive the output of the third inverter;

a tenth inverter, used to receive an output of the ninth inverter;

an eleventh inverter, used to receive an output of the tenth inverter;

a twelfth inverter, used to receive an output of the eleventh inverter and to output the first control signal;

a NOR gate, used to do a NOR-operation of the outputs of the first and fifth inverters and to output the third control signal;

a thirteenth inverter, used to receive the third control signal; and a fourteenth inverter, used to receive an output of the thirteenth inverter and to output the pump signal.

9. The voltage generating circuit as claim 1, wherein a voltage level at the voltage output terminal is about two times of a voltage level of the voltage source when the pump signal is pulled up to the voltage level of the voltage source.

10. A voltage generating circuit, comprising:
a voltage output terminal and a ground terminal;
a diode, having a first node connected to a voltage source and a second node;
a first transistor; controlled by a first control signal;
a second transistor, connected to the first transistor and controlled by the first control signal, wherein when the first transistor is turned-on, the second transistor is turn-off, and when the first transistor is turned-off, the second transistor is turned-on;
a capacitor, having a first terminal and a second terminal, wherein the first terminal is used to receive a pump signal, and the second terminal is connected to the second node;
a third transistor, controlled by a second control signal, when the third transistor is turn-on, the voltage output terminal is connected to the ground terminal;
a fourth transistor, controlled by a third control signal, when the third transistor is turn-on, the voltage output terminal is connected to the voltage source; and
a control unit, used to generate the pump signal, the first, second and third control signals, wherein the second control signal is pulled up after the first control signal is pulled up, and then the second control signal is pulled down before the first control signal is pulled down; wherein the pump signal is pulled down before the second transistor is turn-off; and wherein the first second transistor is turn-on before the pump signal is pulled up,
wherein when the first transistor is turn-on, the second node is connected to the voltage source; and when the second transistor is turn-on, the second node is connected to the voltage output terminal.

11. The voltage generating circuit as claim 10, wherein the diode is a first NMOS transistor, wherein a gate and a drain of the first NMOS transistor are connected to the first node, and a source of the first NMOS transistor is connected to the second node.

12. The voltage generating circuit as claim 11, wherein the first NMOS transistor is a low threshold NMOS transistor.

13. The voltage generating circuit as claim 12, wherein the first transistor is a second NMOS transistor, a gate of the second NMOS transistor is connected to the first control signal, a drain of the second NMOS transistor is connected to the voltage source, and a source of the second NMOS transistor is connected to the second node; and the second transistor is a first PMOS transistor, wherein a gate of the first PMOS transistor is connected to the first control signal, a drain of the first PMOS transistor is connected to the voltage output terminal, a source of the first PMOS transistor is connected to the second node, and a body of the first PMOS transistor is connected to the second node.

14. The voltage generating circuit as claim 13, wherein the third transistor is a third NMOS transistor, and the fourth transistor is a fourth NMOS transistor; wherein a gate of the third NMOS transistor is connected to the second control signal, a drain of the third NMOS transistor is connected to the voltage output terminal, and a source of the third NMOS transistor is connected to the ground terminal; a gate of the fourth NMOS transistor is connected to the third control signal, a source of the fourth NMOS transistor is connected to the voltage output terminal, and a drain of the fourth NMOS transistor is connected to the voltage source.

15. The voltage generating circuit as claim 14, wherein the second and fourth NMOS transistors are low threshold NMOS transistors.

16. The voltage generating circuit as claim 10, wherein the control unit comprises:
a first inverter, used to receive a clock signal;
a second inverter, used to receive an output of the first inverter;
a third inverter, used to receive an output of the second inverter;
a fourth inverter, used to receive an output of the third inverter;
a fifth inverter, used to receive an output of the fourth inverter;
a NAND gate, used to do a NAND-operation of the outputs of first and fifth inverters;
a sixth inverter, used to receive an output of the NAND gate;
a seventh inverter, used to receive an output of the sixth inverter;
an eighth inverter, used to receive an output of the seventh inverter and to output the second control signal;
a ninth inverter, used to receive the output of the third inverter;
a tenth inverter, used to receive an output of the ninth inverter;
an eleventh inverter, used to receive an output of the tenth inverter;
a twelfth inverter, used to receive an output of the eleventh inverter and to output the first control signal;
a NOR gate, used to do a NOR-operation of the outputs of the first and fifth inverters and to output the third control signal;
a thirteenth inverter, used to receive the third control signal; and
a fourteenth inverter, used to receive an output of the thirteenth inverter and to output the pump signal.

17. The voltage generating circuit as claim 10, wherein a voltage level at the voltage output terminal is about two times of a voltage level of the voltage source when the pump signal is pulled up to the voltage level of the voltage source.

* * * * *